(12) United States Patent
Hong

(10) Patent No.: US 6,997,225 B2
(45) Date of Patent: Feb. 14, 2006

(54) CENTRAL POSITIONING DEVICE FOR A LABELING MACHINE OF HEAT SHRINKABLE FILM

(76) Inventor: Chin-Tan Hong, No. 42-35, Shuang Fu, Shuang Fu Village, Min Xiong Shiang, Chia-Yi Hsien (TW)

( * ) Notice: Subject to any disclaimer, the term of this patent is extended or adjusted under 35 U.S.C. 154(b) by 249 days.

(21) Appl. No.: 10/733,298

(22) Filed: Dec. 12, 2003

(65) Prior Publication Data

US 2005/0126715 A1 Jun. 16, 2005

(51) Int. Cl.
*B65B 53/00* (2006.01)
*B65B 11/00* (2006.01)

(52) U.S. Cl. .................. 156/459; 156/556; 156/DIG. 3; 53/557; 53/585

(58) Field of Classification Search .................. 156/84, 156/85, 459, 391, 556, 522, 538, 539, DIG. 3; 264/230, 509; 53/556, 567, 297, 585, 291, 53/389.4, 67, 442
See application file for complete search history.

(56) References Cited

U.S. PATENT DOCUMENTS

| 4,016,704 A | * | 4/1977 | Fujio ........................... 53/399 |
| 4,102,728 A | * | 7/1978 | Smith ......................... 156/362 |
| 4,765,121 A | * | 8/1988 | Konstantin et al. ........... 53/442 |
| 2004/0112016 A1 | * | 6/2004 | Hannen et al. ............... 53/567 |

* cited by examiner

*Primary Examiner*—Sam Chuan Yao
*Assistant Examiner*—Barbara Musser
(74) *Attorney, Agent, or Firm*—Rosenberg, Klein & Lee

(57) ABSTRACT

A central positioning device for a labeling machine of heat shrinkable film includes an upper section and a lower section connected to each other with a fastener; a positioning member provided at an upper end of the lower section; the upper section revolving to adjust for an angle and secured by the positioning member; the film passing through the upper section being pushed downward to change its orientation; a logo on the film falling on a square bottle exactly as required; and folding marks of the film merely falling on the corners of the bottle without displacement to ensure the precise location of the subsequent film to wrap around the bottle.

3 Claims, 5 Drawing Sheets

CENTRAL POSITIONING DEVICE FOR A LABELING MACHINE OF HEAT SHRINKABLE FILM

BACKGROUND OF THE INVENTION (a) Field of the Invention

The present invention is related to a central positioning device for a labeling machine of heat shrinkable film, and more particularly, to one that deflects the heat shrinkable film label for its surface of the logo to precisely match the relative surface on the bottle as desired.

(b) Description of the Prior Art

In earlier time, text or pattern is directly printed on or a sticker is directly adhered to the surface of the bottle. Color performance is monotonous due to technical problem of color scheme in direct printing while the sticker fails to express the sense of quality. Thereafter, labels are made of film in closed loop to be inserted onto the bottle. Usually, the shrinkable film printed with text and pattern is wrapped around the bottle before being thermally treated to fasten the film on the bottle. However, the work efficiency for this production is less satisfactory since it takes to cut the flat film into the size desired and to prop open to wrap around the bottle by manual before being thermally treated into shape. Later, to solve the problem of deficiency in manual work, a heat shrinkable labeling machine is developed to replace the manual operation.

A pair of primary rollers and another pair of feeder rollers are essentially used in the automatic labeling machine of heat shrinkable film of the prior art to prop open the heat shrinkable film to be wrapped around the bottle by rolling to deliver the film and a conic cylinder, i.e., the central positioning device, is used to prop open the film and wrap it around the bottle.

To the mechanism of the central positioning device in the form of a conic cylinder, it has achieved the basic purpose of labeling on the general round bottles. However, when the labeling machine is used on square bottles, the following flaws are observed:

Whereas the heat shrinkable film is continuously printed and wound in the form of a roll, the tubular film is flattened into having two sides flushed against each other resulting in two folding marks that survive even after the film is prop opened by the conic cylinder of the central positioning device. The diameter of the heat shrinkable film before being thermally treated is slightly greater than the outer diameter of the bottle (the square bottle in this case) to facilitate to be inserted onto the bottle. Once the bottle is inserted with the film, the film that contacts the bottle becomes vulnerable to get slacken or displaced, and particularly so when the folding marks fall upon the flat surface of the square bottle. Whereas text and pattern printed on the heat shrinkable film are already positioned in terms of the front, the rear and both sides of the bottle, any displacement of the heat shrinkable film will result in misplaced text and pattern to lose the appearance as desired.

SUMMARY OF THE INVENTION

The primary purpose of the present invention is to provide a central positioning device for a labeling machine of heat shrinkable film that is composed of an upper section and a lower section. The upper section revolves to adjust the angle to deflect the direction of the heat shrinkable film so that the logo on the heat shrinkable film to match on each and all surfaces of the square bottle as required while allowing the folding marks on the heat shrinkable film merely hold against the corners of the square bottle. Accordingly, the heat shrinkable film will not be displaced in relation to the square bottle to ensure of precisely wrapping around the square bottle in position. To achieve the purpose, the upper section and the lower section of the central positioning device is connected to each other with a fastener and a positioning member is provided at the upper end of the lower section to fix the revolving angle of the upper section to be secured in position for the heat shrinkable film passing through the upper section is pushed downward to change its direction.

DETAILED DESCRIPTION OF THE PREFERRED EMBODIMENTS

Figure 1:
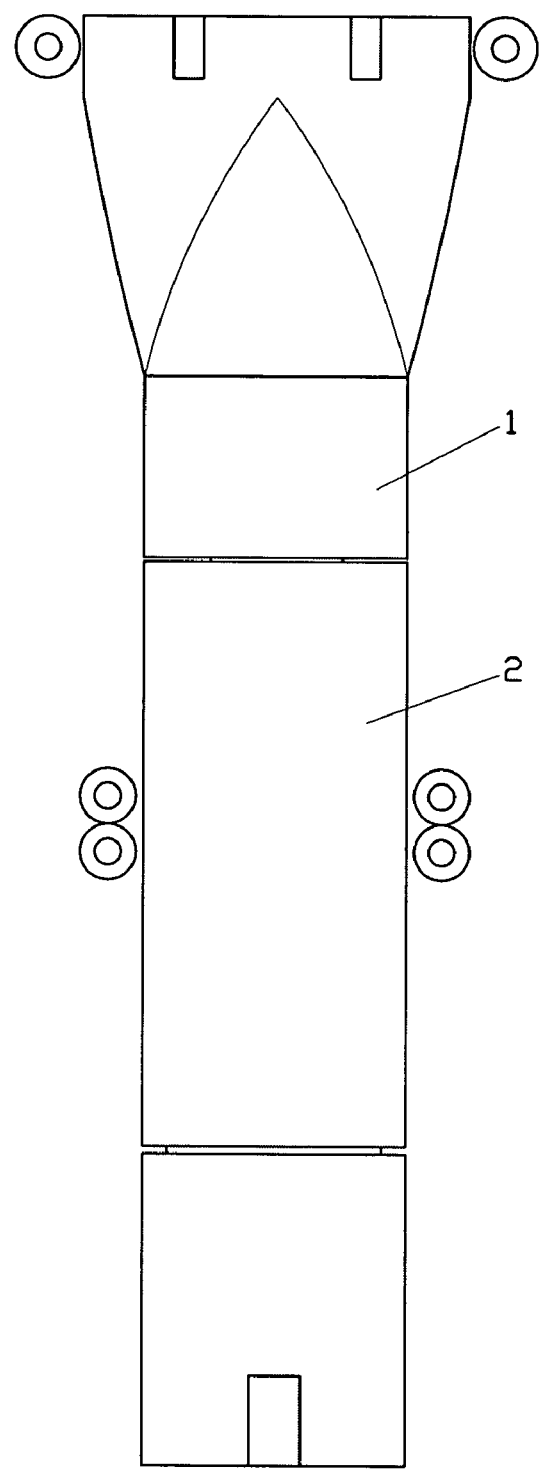
FIG. 1 is a schematic view showing a basic configuration of the present invention.

Referring to FIG. 1, a central positioning device of the present invention is essentially composed of an upper section (1) and a lower section (2). The structure of the upper section (1) is similar to that of the prior art in a conic shape with a flattened wedge at the top that allows revolving as required. The lower section (2) is in cylindrical shape. Both of the upper section (1) and the lower section are separated from each other and then connected to each other to facilitate revolving for a proper angle and secured in position.

Figure 2:
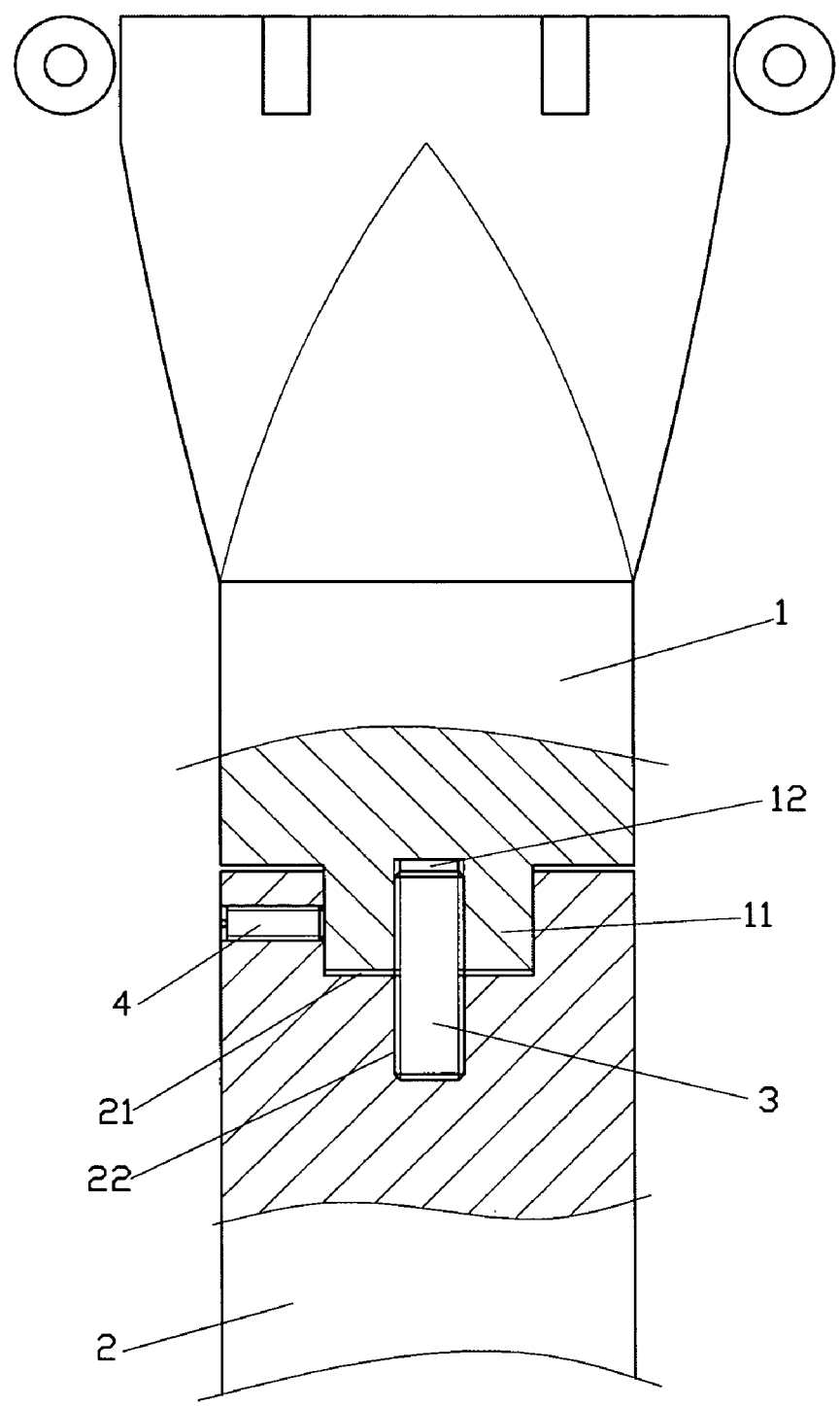
FIG. 2 is a sectional view of a preferred embodiment of the present invention.

As illustrated in FIG. 2 for a preferred embodiment of the present invention, at where the upper section (1) and the lower section (2) of the central positioning device abutted to each other are respectively provided with a protrusion (11) to the upper section (1) and a recess (21) to the lower section (2). Two screw holes (12) and (22) are respectively provided at the center of the protrusion ( 11) and the center of the recess (21). A fastener (3) with its two ends respectively passing through the screw holes (12) and (22) is to connect both of the upper section (1) and the lower section (2). A positioning member (4) is laterally screwed into the upper end of the lower section (2) to such that when the upper section (1) is revolving with the protrusion (11) and the fastener (3) as the axis, the positioning member (4) moves in to hold against the protrusion (11) to secure the upper section (1) in position.

Figure 3:
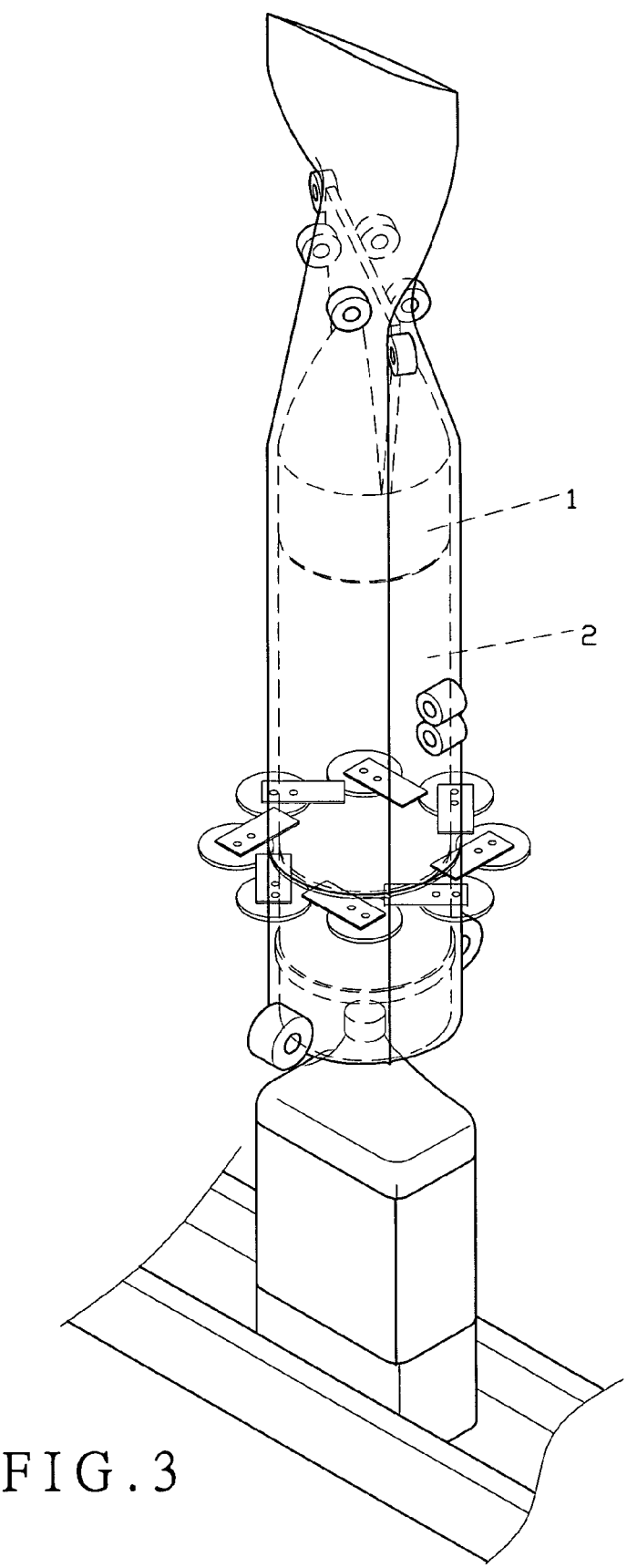
FIG. 3 is a schematic view showing that the preferred embodiment of the present invention is in operation.
Figure 4:
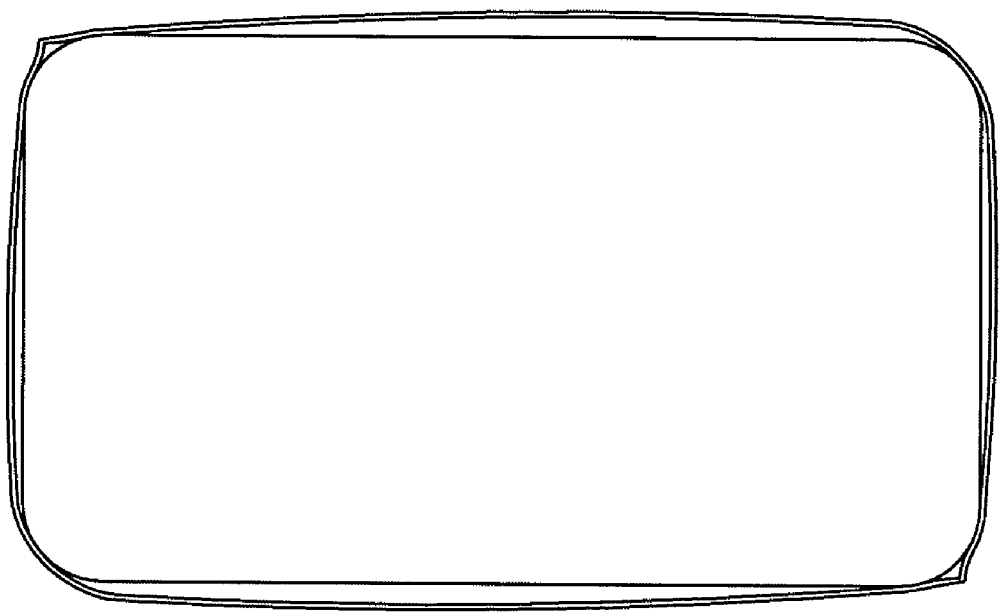
FIG. 4 is a schematic view showing that a heat shrinkable film is wrapping around a square bottle.

As the central positioning device of the present invention prop opens to guide a heat shrinkable film, the upper section (1) of the central positioning device, as illustrated in FIG. 3, revolves first to adjust for a proper angle and is secured in position by means of the positioning member (4). Later when the heat shrinkable film is pushed by the upper section (1) downward to be guided by the lower section (2), the lower part of the heat shrinkable film is deflected for the logo on the lower part of the heat shrinkable film to stay flushed against the surfaces of a square (or a rectangular) bottle as required with the folding marks on the heat shrinkable film to merely press against the corners of the square bottle and to be secured in position as illustrated in FIG. 4. Accordingly, the heat shrinkable film is prevented from making any displacement in relation to the square bottle to make sure that the subsequent thermal treatment of the heat shrinkable film will precisely wrap around the bottle and the logo of the heat shrinkable film falls exactly on each surface of the square bottle as required.

Figure 5:
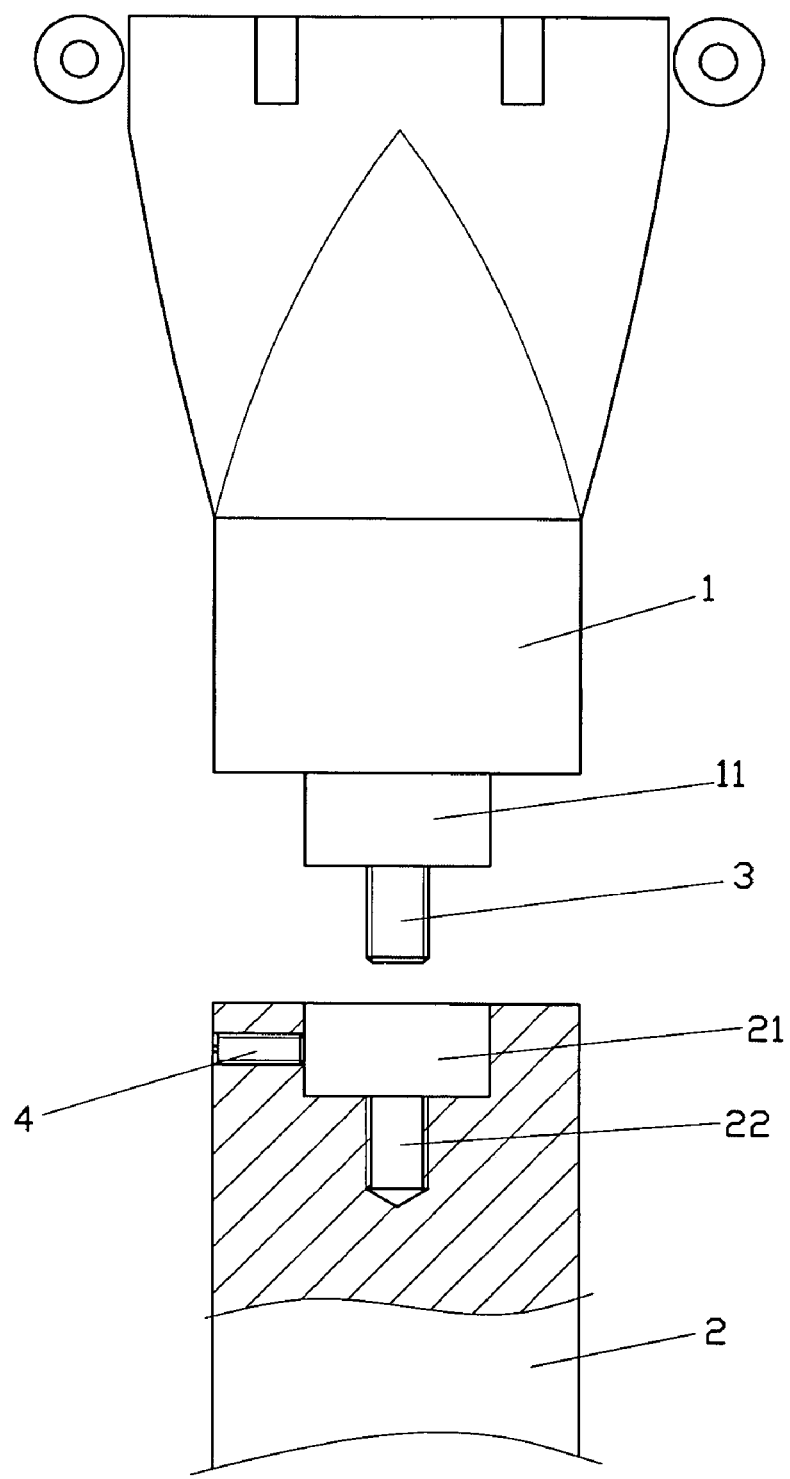
FIG. 5 is a schematic view showing a structure of another preferred embodiment of the present invention.

Furthermore, the protrusion (11) and the recess (21) are respectively provided to the upper section (1) and the lower section (2) as disclosed in the first preferred embodiment. In another preferred embodiment of the present invention as illustrated in FIG. 5, the fastener (3) is directly formed at the center of the protrusion (11) of the upper section (1). The fastener (3) is engaged into the screw hole (22) at the center inside the recess (21) of the lower section (2) and is secured in position by the positioning member (4) to hold against the protrusion (11). Alternatively, the fastener (3) is directly formed at the center in the recess (21) of the lower section (2) (not illustrated).

The central positioning device for a labeling machine of heat shrinkable film by having the central positioning device made of the upper section and the lower section to allow the upper section revolving for adjusting its angle to deflect the heat shrinkable label, thus to facilitate actively change the orientation of the upper section of the central positioning device without changing the conveyance direction of the square bottle and associate positioning structure provides a better labeling effect as a whole.

I claim:

1. A central positioning device for a labeling machine of heat shrinkable film, said central positioning device comprising an upper section and a lower section; the upper section being made in conic form with a flattened wedge top; the lower section being made in a cylindrical form; the upper section and the lower section being connected to each other by means of a fastener; a positioning member being provided at an upper end of the lower section; the upper section being capable of revolving to adjust its angle and secured in position by means of the positioning member; the heat shrinkable film being pushed from the upper section to the lower section for changing its orientation, in combination with a source of heat-shrinkable film having a logo thereon, said heat shrinkable film wrapping around a square or a rectangular bottle on each surface of the bottle; whereby folding marks on the heat shrinkable film falls on corners of the square bottle and are secured in position.

2. A central positioning device for a labeling machine of heat shrinkable film as claimed in claim 1, wherein, a protrusion and a recess are respectively provided to the upper and the lower sections of the central positioning device; a screw hole being each disposed at a center of the upper section and a center of the lower sections; the upper and lower sections being connected by having two ends of the fastener to penetrate through the screw holes; a locking bolt being laterally provided at the upper end of the lower section; and the locking bolt securing the upper section in position by holding against the protrusion of the upper section.

3. A central positioning device for a labeling machine of heat shrinkable film as claimed in claim 1, wherein, the fastener is directly molded at the center of the protrusion of the upper section or at the center of the recess of the lower section of the central positioning device.

* * * * *